United States Patent [19]
Soehnlen

[11] 3,740,075
[45] June 19, 1973

[54] DREDGE CONVERTIBLE TO LAND VEHICLE FOR PORTABILITY

[76] Inventor: Robert M. Soehnlen, 1865 Arrowhead Drive, Beloit, Wis. 53511

[22] Filed: Oct. 1, 1971

[21] Appl. No.: 185,683

[52] U.S. Cl. .............. 280/415 B, 9/1 T, 37/67, 280/30
[51] Int. Cl. .............. B60f 3/00, E02f 3/88
[58] Field of Search .............. 9/1 TR; 280/415 R, 280/414 A, 418, 415 B, 30; 37/54, 58, 67, 72, 73

[56] References Cited
UNITED STATES PATENTS

| | | | |
|---|---|---|---|
| 2,963,801 | 12/1960 | Ellicott, Jr. | 37/67 |
| 3,336,041 | 8/1967 | Bouley | 280/415 R UX |
| 3,594,018 | 7/1971 | Graetz | 280/415 R |
| 2,518,602 | 8/1950 | Crook | 9/1 T |
| 2,784,424 | 3/1957 | Southerland | 280/414 A UX |
| 3,158,881 | 12/1964 | Clausen | 9/1 T |
| 3,611,680 | 10/1971 | Hendrickson | 56/9 |
| 2,455,048 | 11/1948 | Du Brie | 9/1 T |
| 2,944,352 | 7/1960 | Kaufmann | 37/54 |
| 3,656,780 | 4/1972 | Nordstrom | 280/415 R |

FOREIGN PATENTS OR APPLICATIONS

| | | | |
|---|---|---|---|
| 458,515 | 8/1949 | Canada | 280/415 R |

Primary Examiner—Robert E. Pulfrey
Assistant Examiner—Clifford D. Crowder
Attorney—Vernon J. Pillote

[57] ABSTRACT

A dredge apparatus having a wheel carriage assembly swingably mounted on one end of the dredge hull, hydraulic actuators connected to the dredge hull and wheel carriage assembly to move the wheel carriage assembly out of and into an operative position supporting the end of the hull on the ground engaging wheels of the wheel carriage assembly, and a truck hitch unit is attached to the other end of the hull for connecting and supporting the dredge to a truck for towing the dredge overland.

3 Claims, 5 Drawing Figures

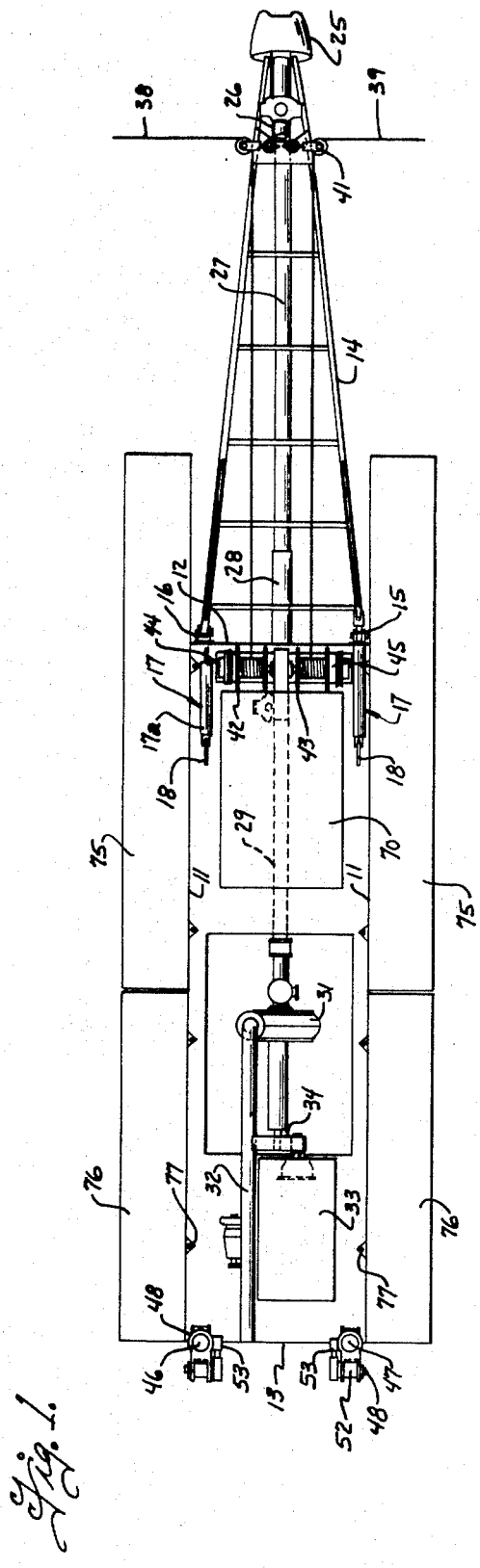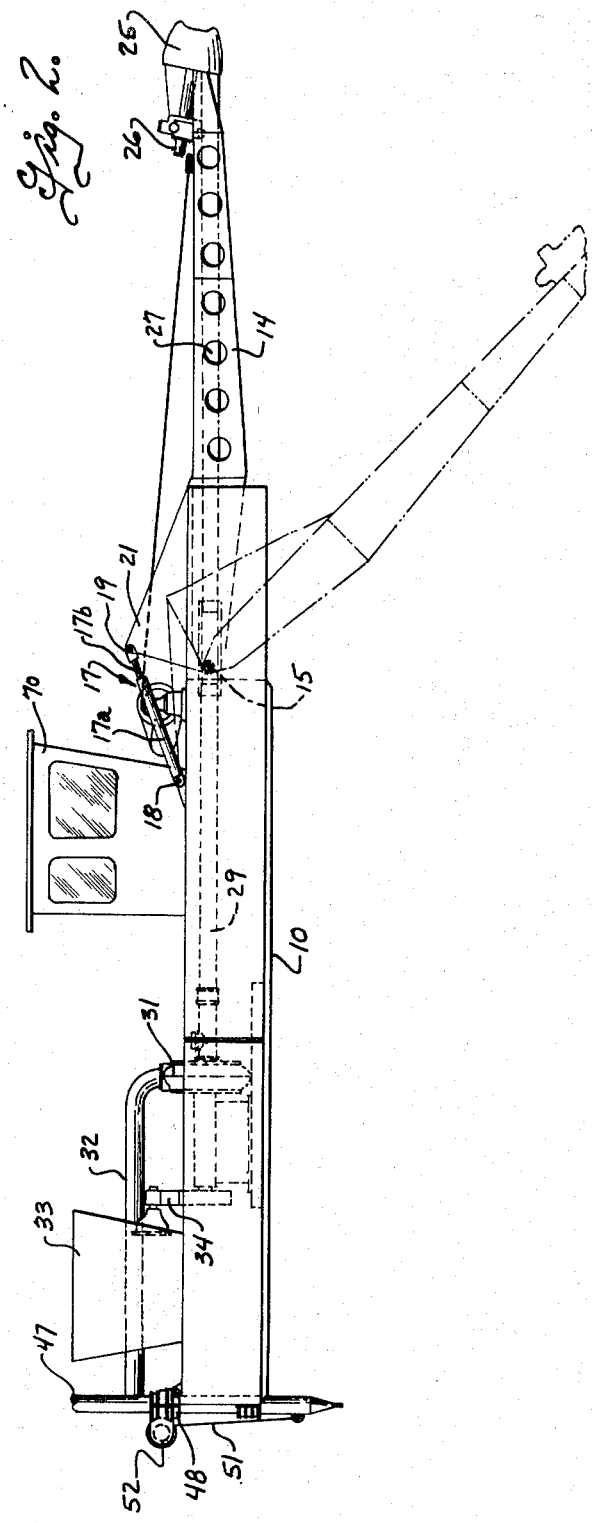

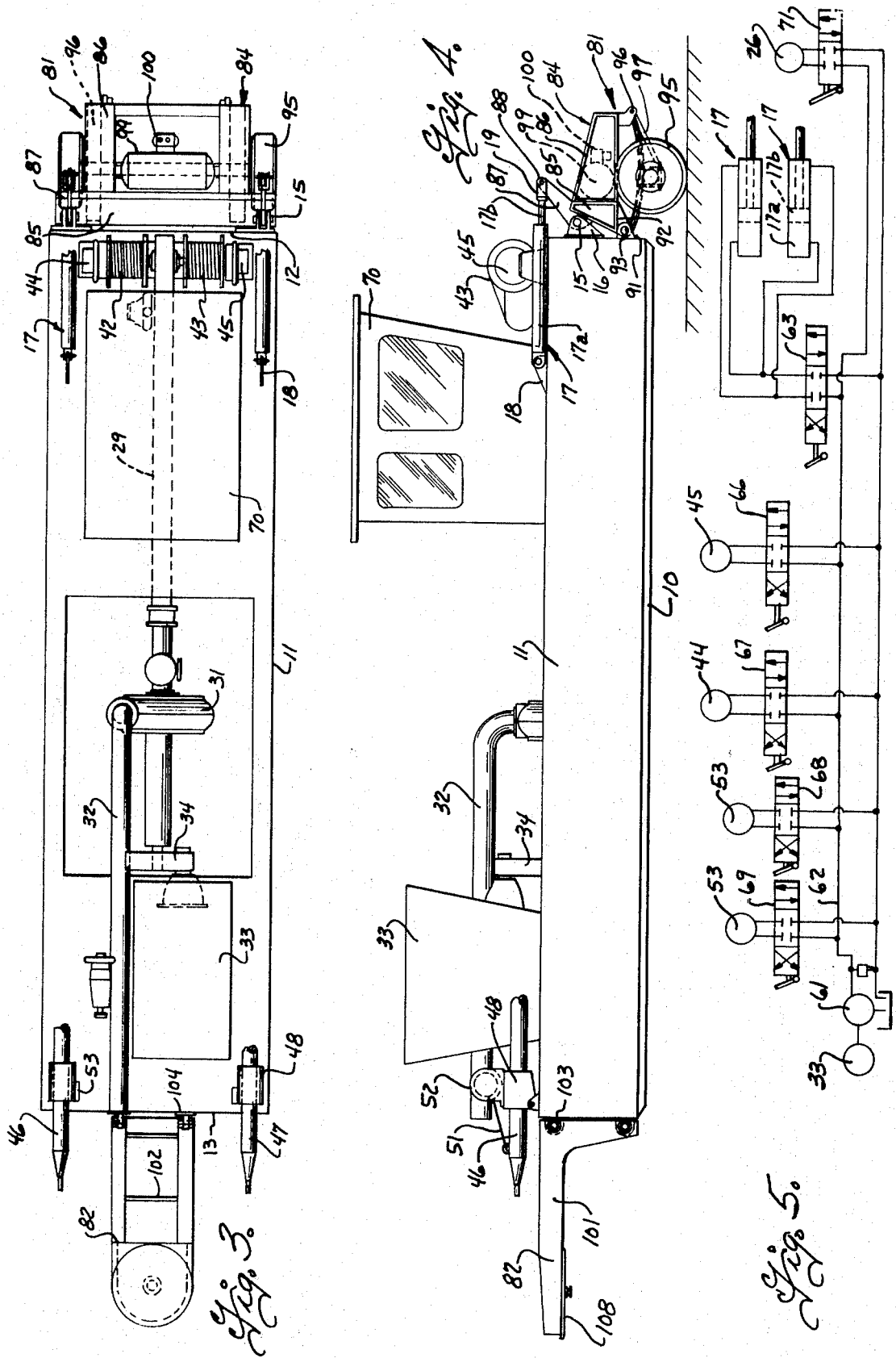

DREDGE CONVERTIBLE TO LAND VEHICLE FOR PORTABILITY

BACKGROUND OF THE INVENTION

Heretofore it has been the general practice with transporting dredges from one location to another, to use trailers to haul the dredge and large cranes for both loading the dredge on the truck trailer and for unloading the dredge from the truck trailer at the destination. Special problems are encountered when moving a dredge into and out of a lake or pond where the area adjacent the water is soft or marshy. Under these circumstances, it has heretofore been necessary to use cranes with very long booms in order to move the dredge from the truck trailer over the marshy area and into the water.

SUMMARY OF THE INVENTION

The present invention overcomes the aforedescribed problems by the provision of a wheel carriage assembly on one end of the dredge which is movable by hydraulic actuators between an inoperative and an operative position supporting the end of the dredge on ground engaging wheels, a truck hitch being provided at the other end of the dredge for attaching and supporting the other end of the dredge on a truck so that the dredge can be trailed overland from location to location. The ground engaging wheels can remain in operative position during movement of the dredge into and out of the water and greatly facilitate movement of the dredge over marshy areas by providing ground engaging support for one end of the dredge.

These, together with other features and advantages of the present invention will be better understood from the following description when taken in connection with the accompanying drawings, wherein:

FIG. 1 is a plan view of a dredge adapted for use in the present invention;

FIG. 2 is a side elevational view of the dredge of FIG. 1;

FIG. 3 is a plan view of a dredge with the present invention applied thereto;

FIG. 4 is a side elevational view of the dredge of FIG. 3; and

FIG. 5 is a schematic illustration of hydraulic controls for the dredge.

The dredge apparatus as shown in FIGS. 1 and 2 includes a generally rectangular hull having a bottom 10, sides 11 and first and second ends 12 and 13. A dredge boom 14, sometimes referred to as a dredge ladder is removably mounted at one end 12 of the hull by pins 15 and boom pivot brackets 16, for vertical swinging movement between a raised position shown in solid lines in FIG. 2 and a lowered position shown in phantom in that figure. The boom 14 is raised and lowered by linear hydraulic actuators 17 including a cylinder member 17a and a piston member 17b. In the preferred embodiment shown, a pair of hydraulic actuators 17 are provided, one adjacent each side of the hull, with one end of the cylinder members 17a pivotally connected by brackets 18 to the boat hull and with the piston member 17b pivotally connected by a clevis 19 to boom brackets 21 rigid with the dredge boom 14. The dredge boom 14 has a rotary cutter head 25 at its outer end conveniently driven by an hydraulic motor 26. A suction line 27 is mounted on the boom and has its outer end communicating with the cutter head 25 and its inner end connected through a flexible conduit section 28 to the suction pipe 29 of a centrifugal dredge pump 31. The dredge pump 31 is located within the dredge hull and has a discharge line 32 extending outboard of the hull. The dredge pump is driven by a motor 33, such as an internal combustion engine mounted on the dredge hull, through a gear and clutch drive 34 in a manner well known in the art. In the dredge apparatus shown, cables 38 and 39 are used to effect swinging of the dredge boom and dredge horizontally during a cut. As will be understood by those skilled in the art, the outboard ends of the cables are anchored outwardly of the dredge boom and the cables are entrained over pulleys 41 and onto cable winches 42 and 43 conveniently driven by hydraulic motors 44 and 45 respectively. A pair of anchoring spuds 46 and 47 are provided at the other end of the dredge hull and are mounted by spud brackets 48 for swinging movement from an upright position as shown in FIGS. 1 and 2 to an inoperative position as shown in FIGS. 3 and 4 resting on the dredge hull. The spuds are vertically slidable in the spud brackets 48 and are conveniently raised and lowered by cables 51 wound around drums 52 and connected to the spud. The cable drums 52 are also advantageously hydraulically driven as by motors 53.

As schematically shown in FIG. 5, power for the several hydraulically driven units is provided by a pump 61 conveniently driven by the main drive motor 33 and which is operative to deliver hydraulic fluid under pressure through a delivery line 62 to a flow reversing control valve 63 that is arranged to reversibly supply fluid to the linear hydraulic actuators 17 for raising and lowering the boom. Valve 63 is preferably of the type diagrammatically shown in FIG. 5 having a neutral position blocking flow to and from the hydraulic actuators to lock the actuators in an adjusted position. Hydraulic fluid is also reversibly supplied to the winch motors 44 and 45 under the control of flow reversing valves 66 and 67, and fluid is reversibly supplied to the spud drive motors 53 under the control of reversing valves 68 and 69. The cutter head drive motor 26 is operated under the control of an on-off valve 71. The several control valves are preferably located in the control cab 70 for operation by the dredge operator.

Float tanks 75 and fuel tanks 76 (FIG. 1) are advantageously mounted outboard of the dredge hull and removably secured thereto as by hanger brackets 77 so that the float tanks and fuel storage tanks can be removed from the sides of the hull to reduce the overall width of the dredge for transportation over highways and the like.

The aforedescribed dredge apparatus is adapted for transportation overland by the provision of a wheel carriage assembly 81 at one end of the dredge hull and a truck hitch assembly 82 at the other end of the dredge hull, as best shown in FIGS. 3 and 4. The wheel carriage assembly 81 includes a rigid frame structure 84 which is mounted for vertical swinging movement at the rear end of the dredge hull. In the form shown, the rigid frame structure includes a cross member in the form of a generally trapezoidal box beam 85 and rearwardly extending beams 86 welded to the cross member inwardly of the ends thereof. Laterally spaced levels 87 are welded to the cross member 85 and form a frame pivot bracket that is adapted to be pivotally mounted by pins 15 to the hull pivot brackets 16 previously described, to enable vertical swinging movement of the wheel carriage assembly relative to the hull. The levers 87 extend upwardly to a level above the hull pivot brackets for connection at their upper ends by pins 88 to the clevis brackets 19 on the outer ends of the fluid actuators 17 so that the fluid actuators operate to raise and lower the frame. Brackets 91 (FIG. 4) are secured to the dredge hull below the pivot brackets 16 and are adapted to cooperate with brackets 92 on the carriage frame to receive a locking pin 93 adapted to selectively lock the frame to the dredge hull when the frame is in its lowered position shown in FIG. 4.

Ground engaging wheels 95 are mounted on the frame, advantageously by a spring suspension 96 including a stabilizer bar 97 to absorb road shock. The wheels 95 are also advantageously provided with brakes (not shown), conveniently of the air operated type, and an air tank 99 and air control valve 100 are also provided on the wheel carriage assembly for operating the wheel brakes. The brake control valve 100 is remotely operated from the truck (not shown), in a manner well understood in the art.

The hitch assembly 82 at the other end of the dredge hull comprises a pair of laterally spaced generally L-shaped frame members 101 which are interconnected by cross members 102 and which are detachably secured to the other end of the dredge hull by pins 103 that removably engage mounting brackets 104 on the dredge hull. The hitch assembly 82 extends forwardly from the dredge hull and has the upper member 108 of a conventional truck fifth wheel assembly which is adapted to interfit with a corresponding lower member on the truck (not shown) to attach and support the forward end of the boat hull on a truck.

From the foregoing it is thought that the construction of the dredge and the wheel carriage and hitch assemblies will be readily understood. The dredge boom 14, and the float and fuel tanks 75 and 76, are removed during transportation of the dredge from location to location to reduce the overall length and width of the dredge and enable movement of the same over highways. The wheel carriage assembly 81 is swingably mounted on one end of the dredge hull, advantageously on the same boom pivot brackets 16 as are used for swingably mounting the boom 14 on the dredge, and the hydraulic actuators 17 are connected by pins 88 to the levers 87 on the wheel carriage assembly to move the wheel carriage assembly between an operative position as shown in FIG. 4 with the ground engaging wheels extending below the underside of the dredge, to an inoperative or raised position. The valve 63 is operative in its center position shown in FIG. 5 to hydraulically lock the actuators 17 in the adjusted position thereof. However, the wheel carriage assembly can also be selectively locked in its lowered position by pins 93 so as to enable unloading of the hydraulic actuators 17 during transportation over long distances. During movement of the dredge into and out of a lake or pond, the wheel carriage assembly can remain in its lowered position to provide ground engaging support for the end of the dredge until the dredge becomes substantially buoyant. The wheel carriage assembly can then be raised and removed for attachment of the dredge boom 14 to the dredge hull. As will be seen, cables 38 and 39 and the cable drums 42 and 43 can be utilized to aid in installing and removing the wheel carriage assembly, when the dredge is in water. The hitch assembly 82 is of course attached to the other end of the dredge for transportation over the ground and, while it can remain attached to the dredge, it is preferably removed during use of the dredge.

While there has been disclosed in the foregoing description a preferred embodiment of the invention, it will be understood by those skilled in the art that variations and modifications can be made within the scope of the appended claims.

The embodiments of the invention in which an exclusive property or privilege is claimed are defined as follows:

1. In a dredge apparatus including an elongated dredge hull having laterally spaced boom pivot brackets on one end, reversible hydraulic actuator means adjacent said one end, and hydraulic fluid power supply means connected to said actuator means for reversibly supply fluid thereto, the improvement comprising: a wheel carriage assembly having a rigid frame and ground engaging wheels mounted on the frame to extend below the underside of the frame, laterally spaced frame pivot brackets on one end of said frame and removable pivot pins connecting said frame pivot brackets to said boom pivot brackets and mounting said frame of the wheel carriage assembly at said one end of the dredge hull for vertical swinging movement relative thereto, lever means rigid with said frame and extending to a level above said boom pivot brackets, means connecting said reversible hydraulic actuator means to said lever means on the frame of the wheel carriage assembly for vertically swinging the wheel carriage assembly into and out of a position in which the ground engaging wheels on the carriage assembly extend below the dredge hull, and a rigid truck hitch unit having means detachably mounting the same on the other end of the dredge hull, the truck hitch unit having means engageable with a truck fifth wheel assembly for connecting and supporting said other end of the dredge hull on a truck.

2. The combination of claim 1 including means engaging said hull and said frame at a level below said boom pivot brackets for selectively locking said frame of the wheel carriage assembly to the dredge hull in a position with the wheels on the wheel carriage assembly extending below the dredge hull to support said one end of the dredge hull on said wheels.

3. In a dredge apparatus including an elongated dredge hull having a bottom, laterally spaced sides and first and second ends, reversible linear hydraulic actuator means having one end thereof pivotally mounted on said dredge hull adjacent said first end, and hydraulic fluid power supply means connected to said actuator means for reversibly supplying fluid thereto, the improvement comprising: a wheel carriage assembly having a rigid frame and ground engaging wheels mounted on the frame to extend below the underside of the frame, pivot means mounting one end of said frame of the wheel carriage assembly on said first end of the dredge hull for vertical swinging movement relative thereto about a generally horizontal pivot axis spaced above the bottom of said dredge hull, said frame having lever means rigid therewith and extending above the level of said pivot axis, means connecting the other end of said reversible linear hydraulic actuator means to the lever means on the frame of the wheel carriage assembly for vertically swinging the wheel carriage assembly into and out of a position in which the ground engaging wheels on the carriage assembly extend below the bottom of the dredge hull, and means including first and second apertured lugs respectively rigidly secured to said first end of said hull and said one end of said frame at a level below said pivot means and a locking pin removably received in said apertured lugs to lock said frame of the wheel carriage assembly to the dredge hull in a position with the wheels on the wheel carriage extending below the bottom of the dredge hull to support said one end of the dredge hull on said wheels, and a rigid truck hitch unit having means detachably mounting the same on said second end of the dredge hull, the truck hitch unit having means engageable with a truck fifth wheel assembly for connecting and supporting said second end of the dredge hull on a truck.

* * * * *